US007926662B2

(12) United States Patent
Ouimette et al.

(10) Patent No.: US 7,926,662 B2
(45) Date of Patent: Apr. 19, 2011

(54) MULTI-TIP BLISTER CARD CHARGING SYSTEM

(75) Inventors: Jennifer Ouimette, Morrison, CO (US); Yen-Lun Lai, Denver, CO (US)

(73) Assignee: Navajo Manufacturing Company, Inc., Denver, CO (US)

( * ) Notice: Subject to any disclaimer, the term of this patent is extended or adjusted under 35 U.S.C. 154(b) by 17 days.

(21) Appl. No.: 12/457,087

(22) Filed: Jun. 1, 2009

(65) Prior Publication Data
US 2010/0300927 A1    Dec. 2, 2010

(51) Int. Cl.
*B65D 85/00* (2006.01)
*B65D 73/00* (2006.01)
*H02J 7/00* (2006.01)

(52) U.S. Cl. ........ 206/702; 206/463; 206/471; 320/107; 320/112; 320/119

(58) Field of Classification Search .......... 206/461–471; 320/107, 114, 119, 112, 113
See application file for complete search history.

(56) References Cited

U.S. PATENT DOCUMENTS

| 4,702,374 | A | 10/1987 | Kelner | |
|---|---|---|---|---|
| 5,191,275 | A * | 3/1993 | Singhal | 320/112 |
| 6,349,830 | B1 | 2/2002 | Lebron | |
| 6,814,238 | B2 | 11/2004 | Lee | |
| 6,894,457 | B2 * | 5/2005 | Germagian et al. | 320/119 |
| 6,909,259 | B2 * | 6/2005 | Chung | 320/107 |
| 6,953,117 | B2 | 10/2005 | Schein et al. | |
| 6,968,950 | B2 | 11/2005 | Eisenbraun | |
| 7,145,312 | B2 * | 12/2006 | Lanni | 320/114 |
| 7,557,537 | B2 * | 7/2009 | Zick et al. | 320/114 |
| 7,777,448 | B2 * | 8/2010 | Beghelli | 320/113 |

* cited by examiner

*Primary Examiner* — Bryon P Gehman
(74) *Attorney, Agent, or Firm* — Jacobson Holman PLLC

(57) ABSTRACT

A single electronic charging system that can be used for different electronic components by changing a tip portion of a charging cord of the charging system. A plurality of tip portions are included with a single charging source that interfaces either with an AC power source, a 12 to 24 volt DC power source or a battery power source by merely threading a connector portion of the charging cord onto an electric cable.

18 Claims, 6 Drawing Sheets

MULTI-TIP BLISTER CARD CHARGING SYSTEM

FIELD OF THE INVENTION

The present invention relates to a charging system for recharging electronic equipment such as cell phones, MP3 players and other electronic devices.

BACKGROUND OF THE INVENTION

With the explosion in use of portable electronic equipment, there is a need for a universal type charging system which can be adapted to different types of electronic equipment including cell phones and MP3 players, for example.

Usually, every different electronic component requires its own unique electric charging connection configuration. The charging of the electronic component whether by an AC outlet or a car charging system, usually requires the use of two charging systems, and can prove to be expensive if the consumer decides to often change or buy different components.

Accordingly, there is a need to provide a single electronic component charging system which is adapted to be used with many different electronic components and usable with different power sources. This would avoid the need to purchase separate AC power and automobile 12 to 24 volt charging systems for a single component and having to replace these charging systems when a new electronic component is purchased.

SUMMARY OF THE INVENTION

Accordingly, it is an object of the present invention to provide a single electronic charging system that can be used for different electronic components by changing a tip portion of a charging cord of the charging system. A plurality of tip portions are included with a single charging source that interface with either an AC power source, a 12 to 24 volt DC power source or a battery power source by merely threading the tip portion of the charging cord onto an electric cable.

However, when there is a need to change the tip portion, the old tip portion is merely unscrewed from the electric cable and a new tip portion is threadingly secured to the electric cable. The electric cable may be permanently affixed or removably mounted on the charging source.

Further, the plurality of tip portions are included with the charging source in a manner such that an engagement end of the tip portion which engages with the electronic components, is exposed from a blister pack containing the charging source. The exposed engagement ends are readily available for testing by the consumer to see if a particular engagement end of the tip portion correctly inter-engages with their electronic component. By giving the consumer access to a plurality of different tip portions, mistakes are avoided in purchasing the wrong tip portion. This is helpful because even with a single manufacturer of electronic components, different tip portions may be required.

In addition, the charging cords are inter-engaged with a transparent plastic blister, to secure the threaded end of each charging cord within the display package for security purposes while allowing the engagement end of the tip portions to hang freely and exposed from the display package. This provides a secure anchoring of the charging cords in the package for display and testing purposes without affecting the integrity of the package.

It is also easy to access the tip portion for testing inter-engagement with the electronic component. It is not necessary to remove the tip portion, partially or wholly, from engagement in a blister package. The tip portion is always exposed, lying along a surface of the display package.

It is therefore an object of the present invention to provide a display card having at least one charging cord having a threaded end and a connector tip end interconnected by a charging wire.

It is another object of the present invention to provide a display card having at least one charging cord having a threaded end and a connector tip end interconnected by a charging wire with a plurality of charging cords mounted on one side of a display card and a charging source located on the opposite side of the display card.

It is still yet another object of the present invention to provide a display card having at least one charging cord having a threaded end and a connector tip end interconnected by a charging wire with a plurality of charging cords mounted on one side of a display card and a charging source located on the opposite side of the display card and the charging tip of the charging cord hanging free from a blister packaging encapsulating the threaded end of the charging cords.

It is still another object of the present invention to provide a display card having at least one charging cord having a threaded end and a connector tip end interconnected by a charging wire with a plurality of charging cords mounted on one side of a display card and a charging source located on the opposite side of the display card and the charging tip of the charging cord hanging free from a blister packaging encapsulating the threaded end of the charging cords with the charging source having a direct current connector, an alternating current connector and a battery power connector.

These and other objects of the invention, as well as many of the intended advantages thereof, will become more readily apparent when reference is made to the following description taken in conjunction with the accompanying drawings.

The following drawings illustrate examples of various components of the multi-tip charging system disclosed herein, and are for illustrative purposes only. Other embodiments that are substantially similar can use other components that have a different appearance.

DETAILED DESCRIPTION OF THE PREFERRED EMBODIMENTS

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

Figure 1:
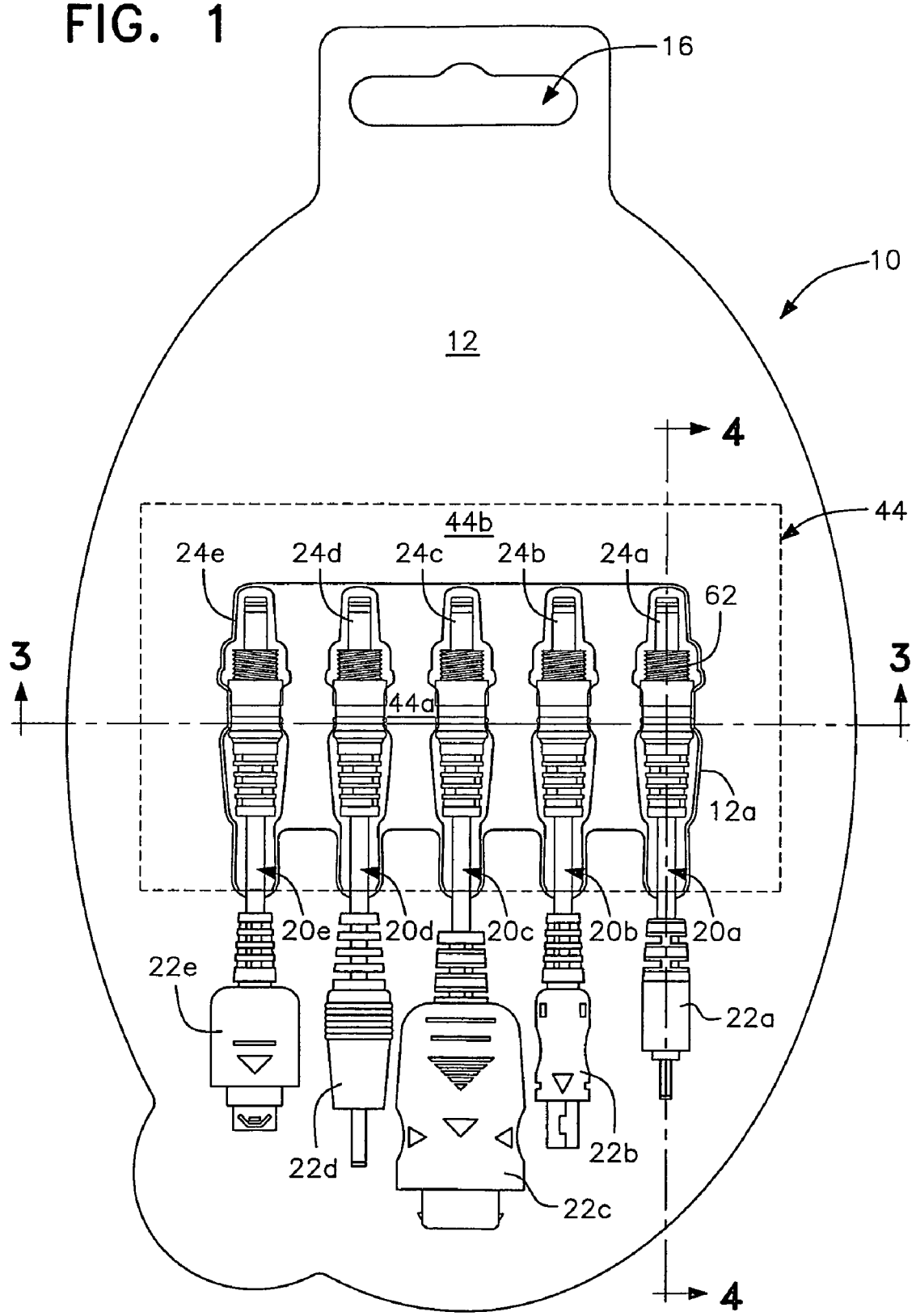
FIG. 1 is a plan view of the rear surface of the display package of the present invention.
Figure 2:
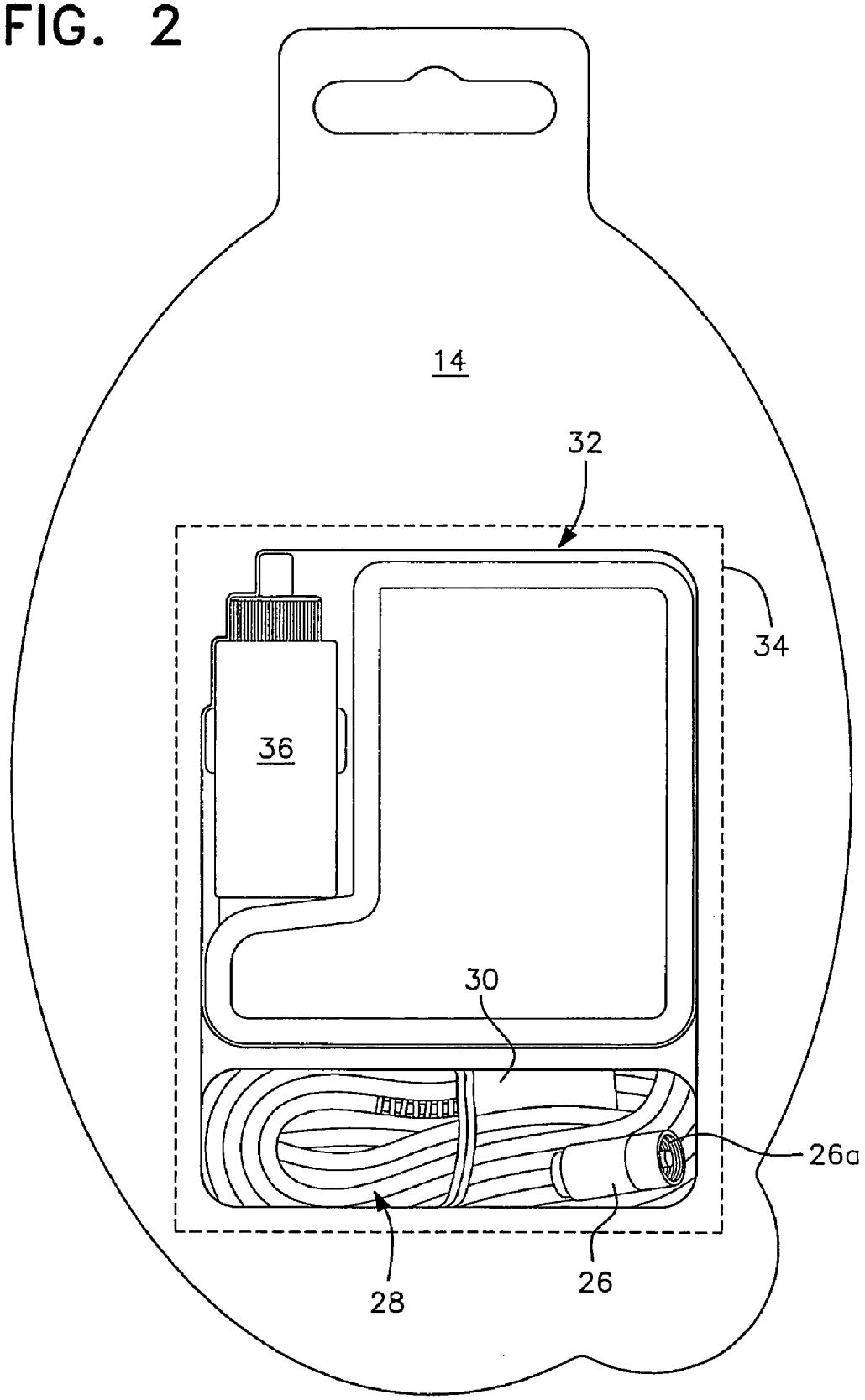
FIG. 2 is a front view thereof.

With reference to the drawings, in general, and to FIGS. 1 and 2, in particular, a multi-tip charging system embodying the teachings of the subject invention is generally designated as 10. In FIG. 1, the rear surface 12 of a charging system display card is shown. FIG. 2 illustrates the front surface 14. In these figures, the display card includes a substantially oval configuration having an upper opening 16 for hanging the display card at a point of sale.

Located on the rear surface 12 of the display card 10 is a plurality of charging cords 20a through 20e, for example. Each of the charging cords includes a charging tip portion 22a through 22e and a threaded connector end 24a through 24e.

Each of the charging tip portions 22a through 22e are different. Each of the connector ends 24a through 24e is identical for cooperative inter-engagement with a threaded open end 26 of an electric cable 28. The opposite end of the electric cable 28 includes a USB connector 30 for inter-engagement of the charging cords with a charging source 32. The charging source is held within a plastic blister portion 34 and projects from the front surface 14 of the display card.

The charging source 32 includes a 12 to 24 volt DC power terminal 36 for engagement with a power plug of an automobile. The charging source also includes a 100-240 volt, AC power source prongs 38 which are pivotally mounted on the charging source 32. Also, 9 volt positive and negative battery terminals 40 are located on a side of the power source 32. A USB inlet 42 is for receipt of the USB connector 30 at the end of the electric cable 28.

In operation, one of the charging cords 20a through 20e is selected based upon the appropriate charging tip 22a through 22e configuration for an electronic component. The selected charging cord 20a, for example, is cut out of the blister packaging 44 on the rear surface 12 of the display card.

The threaded connector end 24a is threaded into the threaded open end 26 of the electric cable 28. The USB connector 30, at the opposite end of the electric cable 28, is inserted into the USB opening 42 on the side of the charging source 32. The charging source 32 is then electrically connected with either a 12 to 24 volt DC power source by terminal 36, an AC power source by plug prongs 38 or a 9 volt battery supply source by connection with positive and negative terminals 40. The charging tip 22a, for example, is then inserted into an appropriate electronic component to initiate charging or to maintain a constant power flow to the electronic component to which the charging tip 22a is connected.

At a point of sale, it is possible for a consumer to test the various charging tips 22a through 22e for appropriate inter-connection with an electronic component such as a cell phone, for example. The charging tips 22a through 22e are exposed and lie along the rear surface 12 of the display card for active engagement by a consumer. The threaded connector ends 24a through 24e are restrained within the transparent blister packaging 44, but are visible to the consumer.

Figure 3:
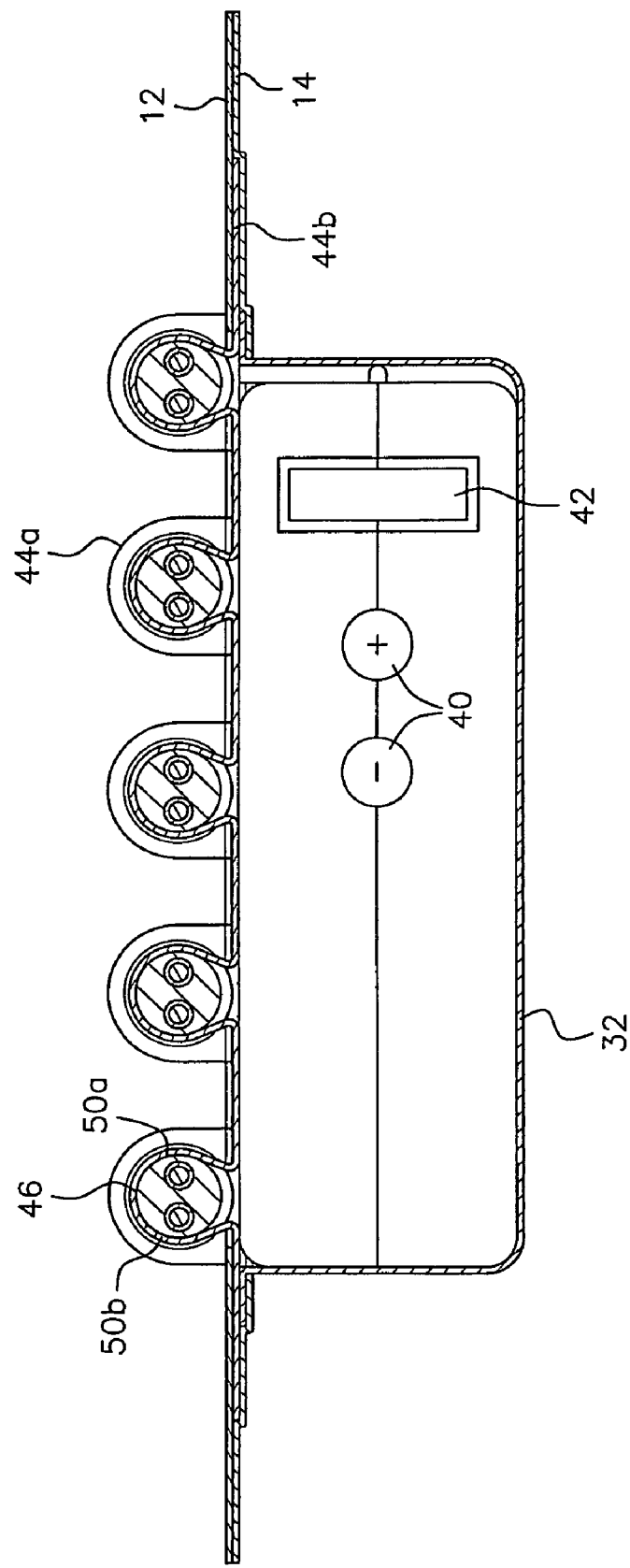
FIG. 3 is a section view taken along line 3-3 of FIG. 1.
Figure 4:
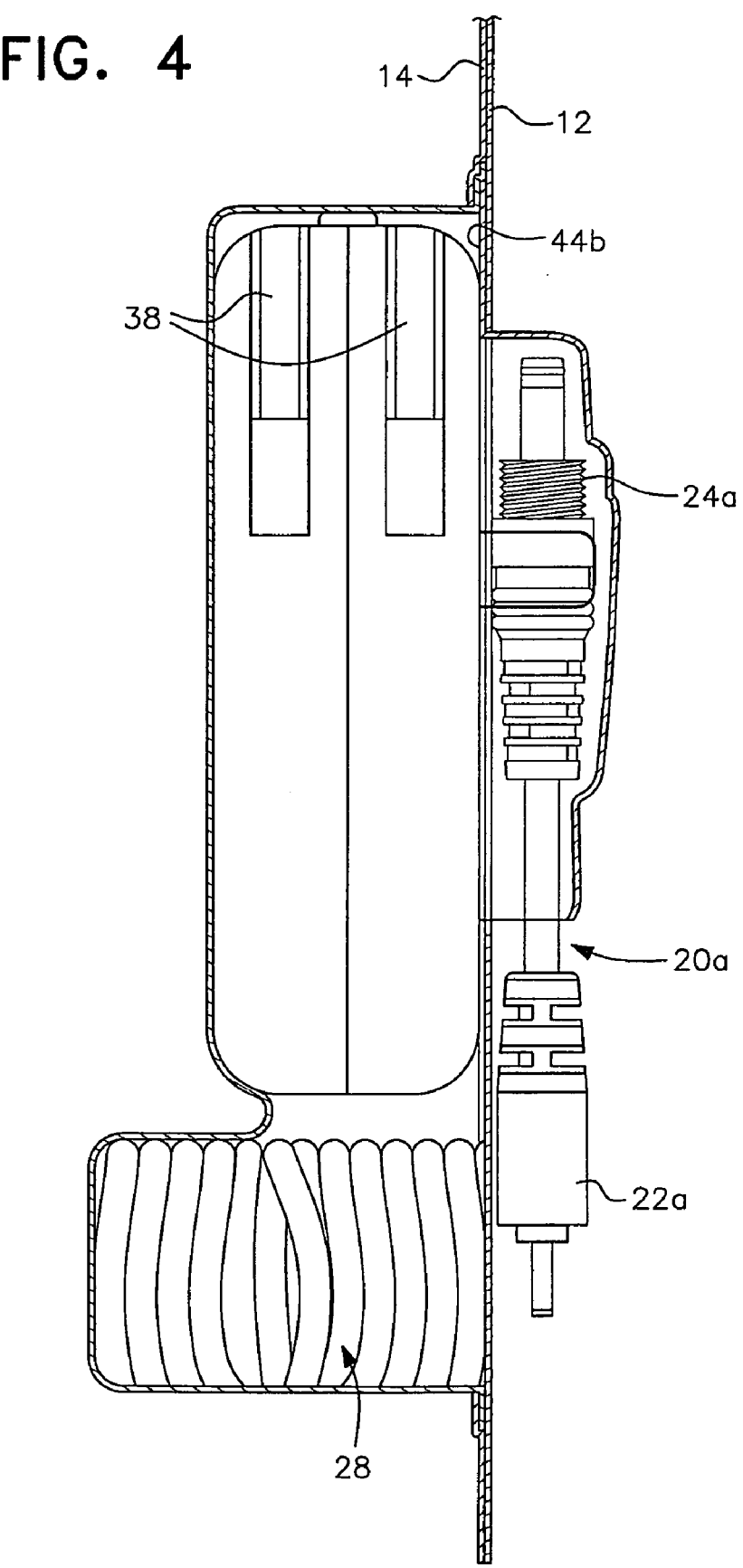
FIG. 4 is a section view taken along line 4-4 of FIG. 1.

Retention of the charging cords is accomplished by a portion 44a of the blister packaging projecting through an opening 12a in the rear surface 12 of the display card. The remainder 44b of the blister packaging is flat and is held between the rear surface 12 and the front surface 14 of the display card as shown in FIGS. 3 and 5.

Figure 5:
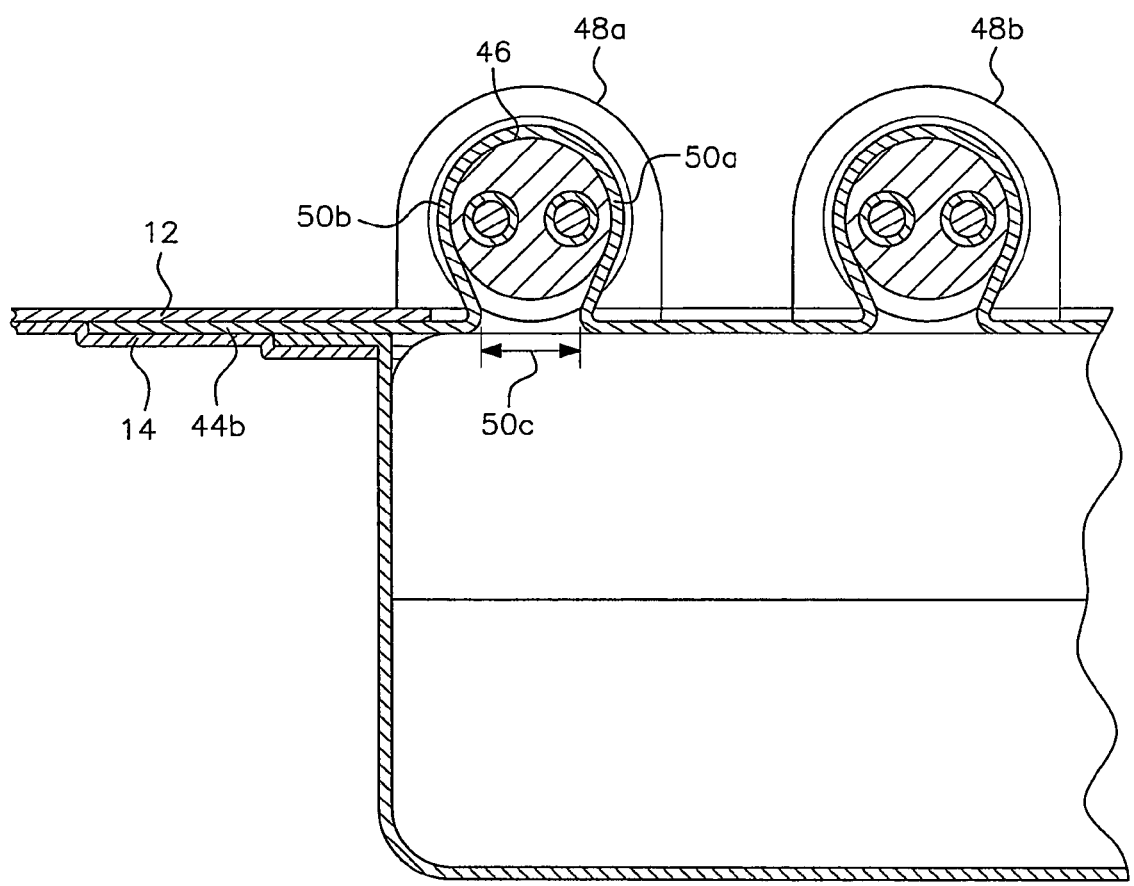
FIG. 5 is an enlarged view of the section taken along line 3-3 of FIG. 1 to illustrate the friction fit of the charging tip as held in a restricted opening of the blister portion.
Figure 6:
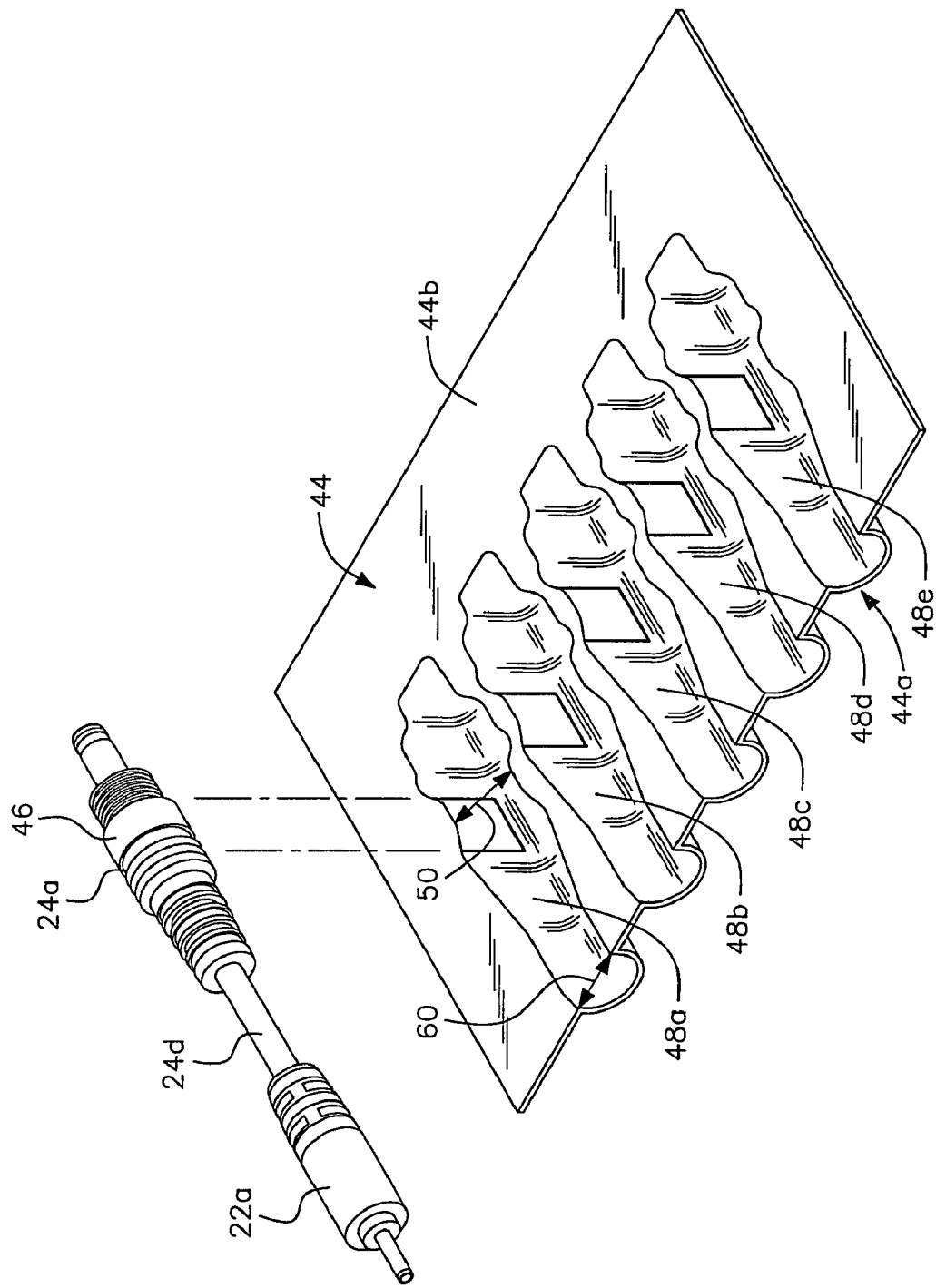
FIG. 6 is an exploded perspective view of the charging tip portion and the blister portion into which the charging tip portion is held by a friction fit.

The exposed portion 44a of the blister packaging is of a special configuration as shown generally in FIG. 5 and more particularly in FIG. 6. The five recessed portions shown in FIG. 6, which when viewed from an opposite side as in FIG. 1, project from the rear surface 12, and are shaped to accommodate the charging tips 24a through 24e of the charging cords 20a through 20e.

In the example shown in FIG. 6, a cylindrical collar 46 of each connector ends 24a through 24e is dimensioned to be held by a friction fit in the recesses 48a through 48e of the blister packaging such that a gap 50 between opposed side walls of each recess 48a through 48e is less than the diameter of the collar 46. The collar 46 is thereby forced into the recesses 48a through 48e to spread apart the opposite sidewalls forming the gap 50 and after passage through the gap 50, the side walls 50a, 50b of the gap 50 snap around the collar 46 so as to retain the collar 46 in the recess 48a, for example.

The curved sidewalls 50a, 50b have an opening 50c which is of a width less than the diameter of the collar 46. The charging cords are thereby rigidly held in place in their respective recesses in the projecting blister portions 44a, including the recesses 48a through 48e, so that when an individual tests a charging tip portion 22a through 22e with their electronic component, there is a strong resistance against the charging cord being pulled from the display package.

An additional mechanism for retaining the charging cords in place in their respective recesses is that each recess is reduced in width at one end to a width 60 within which the charging wire interconnecting the tip portion and the connector end may slide without resistance. However, any pulling on the charging tip 22a will move the threaded portion 24a in the direction of width 60. Width 60 is of a dimension less than that of the threaded connector end 24a and particularly collar 46 so that the charging cord cannot be pulled from the packaging.

The internal threading 26a of the open end 26 of the cable 28, is used to inter-engage with the external threading 62 of the threaded connector ends 24a through 24e. This provides a secure connection between the cable 28 and the charging cords 20a through 20e. An electrical connection is completed by the terminal tips of threaded connector ends 24a through 24e and an internal pin of the open end 26 of the cable 28.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

We claim:

1. A charging system for an electronic component, said charging system comprising
a display card,
at least one charging cord mounted on said display card, each of said at least one charging cord including a charging tip end and a threaded free end interconnected by a charging wire, and
a plastic blister mounted on said display card, said plastic blister holding each said threaded free end on said display card and each said charging tip end extending out of and being free of said plastic blister.

2. The charging system of claim 1, wherein said plastic blister has a portion with a width less than a portion of said threaded end so as to secure each said threaded free end in said plastic blister while each said charging tip end remains out of said plastic blister for connection by a consumer with an electronic component.

3. The charging system of claim 1, wherein a charging source is mounted on said display card.

4. The charging system of claim 3, wherein said charging source includes a 12 to 24 volt DC connector and an AC connector.

5. The charging system of claim 4, wherein said charging source includes a 9 volt battery connector.

6. The charging system of claim 3, wherein said charging source includes an electric cable interconnecting said charging source and each said threaded free end of said at least one charging cord.

7. The charging system of claim 6, wherein each said threaded free end of said at least one charging cord is externally threaded and said electric cable includes an internally threaded end cooperating with each said threaded free end of said at least one charging cord to connect each said charging tip end with said charging source.

8. The charging system of claim 1, wherein there are a plurality of charging cords mounted on said display card.

9. The charging system of claim 8, wherein said charging tips of said plurality of charging cords lie along and are free of a surface of said display card, each of said charging tips are different from each other while each of the threaded free ends of the plurality of charging cords are the same.

10. The charging system of claim 3, wherein said charging source is located on an opposite side of said display card from said at least one charging cord.

11. A universal charging system for different electronic components, said charging system comprising
  a display card,
  a plurality of charging cords, each one of said plurality of charging cords including a charging wire having a charging tip and a threaded free end at opposite ends of said charging wire,
  the charging tip of each one of the plurality of charging cords being different, and
  a plastic blister mounted on said display card, said plastic blister holding said threaded free ends of said plurality of charging cords on said display card, said charging tips of said plurality of charging cords extending out of and being free of said plastic blister and lying along a surface of said display card.

12. The universal charging system of claim 11, wherein said plastic blister is transparent.

13. The universal charging system of claim 11, wherein said plastic blister has a portion with a width less than a portion of each of said threaded free ends so as to secure said threaded free ends in said plastic blister while said charging tips remain out of said plastic blister for connection by a consumer with an electronic component.

14. The universal charging system of claim 11, wherein a charging source is mounted on said display card.

15. The universal charging system of claim 14, wherein said charging source includes a 12 to 24 volt DC connector and an AC connector.

16. The universal charging system of claim 14, wherein said charging source includes an electric cable interconnecting said charging source, by a connecting end of said electric cable, and said threaded end free ends of said plurality of charging cords, said connecting end of said electric cable including threading shaped complementary to said threaded free ends of said plurality of charging cords.

17. The universal charging system of claim 16, wherein said threaded free ends of said plurality of charging cords is externally threaded and said electric cable includes an internally threaded end cooperating with said threaded free ends of said plurality of charging cords to connect said charging tips with said charging source.

18. The universal charging system of claim 14, wherein said charging source is located on an opposite side of said display card from said at least one charging cord.

\* \* \* \* \*